Aug. 10, 1937.  W. H. FISCHER  2,089,739
MULTIPLE TYPE ELECTRIC APPLIANCE
Filed Aug. 3, 1936
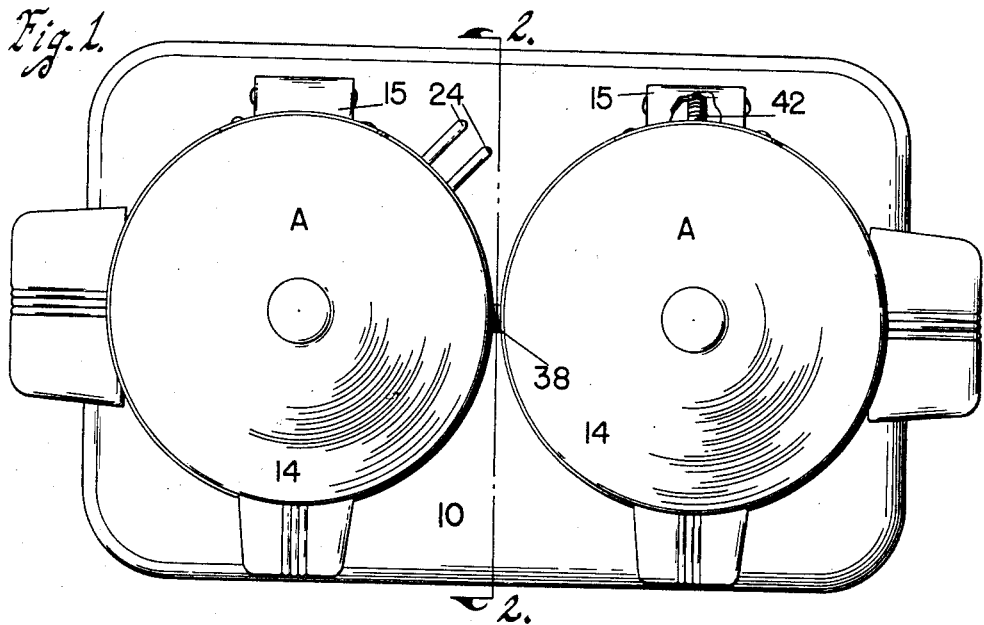
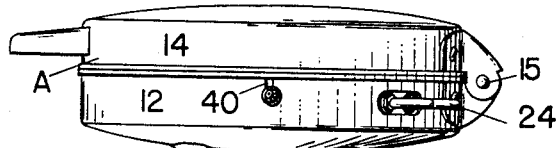
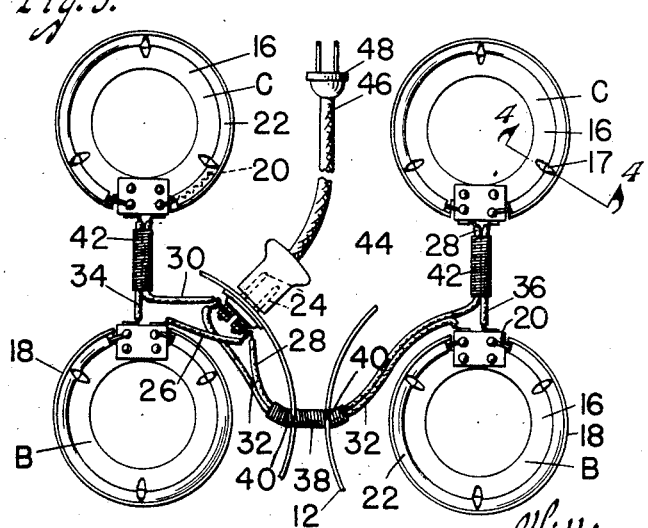
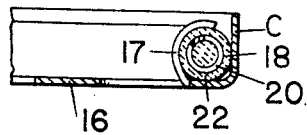
Witness
H. S. Munzenmaier
Inventor
William H. Fischer
by Bair, Freeman & Sinclair
Attorneys Patented Aug. 10, 1937

2,089,739

UNITED STATES PATENT OFFICE 2,089,739

MULTIPLE TYPE ELECTRIC APPLIANCE

William H. Fischer, St. Louis, Mo., assignor to Knapp-Monarch Company, St. Louis, Mo., a corporation of Missouri Application August 3, 1936, Serial No. 94,052

5 Claims. (Cl. 219—19)

An object of my invention is to provide a multiple type electric appliance in which the heating elements of the appliances are connected in a simple and inexpensive manner, whereby plugging in one appliance automatically takes care of the current supply for the remaining appliances.

Still a further object is to provide a structure including a simple base member and a plurality of electric appliances mounted thereon and each provided with a heating element, a pair of terminals being provided with which electric connection can be made, such as by the usual prong, prong plug and supply cord, and the appliances being electrically interconnected so that they can all be energized by making one electric connection with one set of terminals provided for this purpose.

A further object is to provide waffle irons or the like having hinged portions and lower casings, each provided with a heating element, and to make provision for connecting all the heating elements to a single source of current connection, the various wiring for this purpose extending from one waffle iron casing to the other and being protected by coil springs or other types of conduits spanning the distance between the casings.

With these and other objects in view, my invention consists in the construction, arrangement and combination of the various parts of the device, whereby the objects contemplated are attained, as hereinafter more fully set forth, pointed out in my claims, and illustrated in the accompanying drawing, in which:

Figure 1 is a plan view of a multiple type electric appliance embodying my invention.

Figure 2 is a sectional view on the line 2—2 of Figure 1.

Figure 3 is a laid-out view of the heating elements of the appliances showing the electric connections therebetween and with a pair of connector prongs supported by the casing of one of the electric appliances; and Figure 4 is an enlarged sectional view on the line 4—4 of Figure 3 illustrating the construction of one of the heating elements.

On the accompanying drawing I have used the reference numeral 10 to indicate an electric appliance base. This is a single base provided for a plurality of electric appliances A, two of which are illustrated, and which are illustrated as small size waffle irons.

Each appliance A has a lower casing 12 and an upper casing 14, the two being suitably hinged together by hinges 15. The waffle irons and the base 10 may be connected together in any suitable manner such for instance as disclosed in my Patent Number 2,040,369 of May 12, 1936.

Within each lower casing 12 a heating element B is provided, while in each upper casing 14 a heating element C is provided. These elements may each comprise a round sheet metal plate 16 having a peripheral flange 18 within which is placed a coiled heating resistance 20 embedded in argillous material or the like 22. The heating elements are retained within the casings 12 and 14 in any suitable manner, such as by tongues 17.

One of the casings 12 is provided with a pair of electrical terminals 24, such as the usual types of prongs provided on electric appliances. One of these prongs is wired by the wires 26 and 28 to the left heating element B and the right heating element C in Figure 3, wherein the heating elements have been laid out and the casings 12 and 14 omitted with the exception of small portions of the casings 12 to show their positions relative to the heating elements B. The other connector prong is wired by the wires 30 and 32 to the left heating element C and the right heating element B. The left heating elements B and C are connected by a wire 34, while the right heating elements B and C are connected by a wire 36.

By this particular arrangement, the left heating elements B and C and the right heating elements B and C, or in other words, the heating elements of each appliance A, are connected with the prongs 24 and thereby the appliances are connected in parallel. It is obvious, of course, that they may be connected in any other manner found suitable for the wattage required, available current, and size of resistance wire used.

The wires 28 and 32 extending from one casing 12 to the other one, pass through a conduit 38 provided for protecting the wires where they span the distance between the two casings and are thereby exposed. The conduit spans this distance and extends slightly into each casing 12, slots 40 being provided to receive the coils of the conduit 38. The wires 30, 34, 28 and 36 extending from the heating elements B to the heating elements C are likewise enclosed in conduits 42 which protect the wires against becoming frayed where they pass through the hinges 15 from the lower heating elements to the upper heating elements.

The conduits 42, being coil springs, permit bending of the wires so as to not interfere with the hinge action, yet protect them against short circuit.

The prongs 24 are so located that a cord plug 44 when associated therewith, is located substantially between the appliances A at the rear of the base 10. At 46 the usual supply cord is illustrated terminating in a connector 48 to be plugged into a wall socket.

My arrangement provides for automatic connection of both appliances with the supply current whenever a single supply cord is connected with the terminals 24. Obviously the device can be similarly made for more than two appliances.

Some changes may be made in the construction and arrangement of the parts of my device without departing from the real spirit and purpose of my invention, and it is my intention to cover by my claims any modified forms of structure or use of mechanical equivalents which may be reasonably included within their scope.

I claim as my invention:

1. In a multiple type electric appliance, a base, a plurality of electric cooking appliances mounted thereon closely adjacent each other and adapted for only simultaneous use, each appliance having a heating element therein, connector prongs mounted on and carried by only one of said appliances, electric interconnections between the heating elements of said appliances, said connector prongs being connected to the heating element of the appliance carrying said prongs, said electric interconnections spanning the distance between the adjacent portions of said appliances and spaced above the base.

2. In a device of the class described, a common base, a plurality of electric appliances mounted thereon adapted for simultaneous use and each comprising a two part casing, one part spaced above the other, the lower casing and the upper casing being hingedly connected together, each appliance having a heating element in each part of its casing, electric terminals carried by only one of said lower casings, and electric interconnections between said terminals and the heating element of the lower casing having the terminals carried thereby and the heating element of each of the other parts of the casing of each appliance, said electric interconnections between the appliances themselves being free of the base and spaced thereabove.

3. In a device of the class described, a common base, a plurality of electric appliances mounted thereon adapted for simultaneous use and each comprising a two part casing, one part spaced above the other, the lower casing and the upper casing being hingedly connected together, each appliance having a heating element in each part of its casing, electric terminals carried by only one of said lower casings, and electric interconnections between said terminals and the heating element of the lower casing having the terminals carried thereby and the heating element of each of the other parts of the casings of each appliance, said electric interconnections between the appliances themselves being free of the base and spaced thereabove and passing from one lower casing to the other at points closely adjacent each other.

4. In a multiple type electric appliance, a common base member, a plurality of electric cooking appliances mounted thereon, adapted for simultaneous use and for successive refilling thereof with material to be cooked, each of said appliances having a casing comprising a lower part and an upper part hinged relative to said lower part, a heating element in each lower part, and a heating element in each upper part, electric terminals supported on one of said casings, and electrical interconnections between said terminals and each of said heating elements, said electric interconnections between the appliances themselves being free of the base and spaced thereabove.

5. In a multiple type electric appliance, a supporting base, a pair of similar electric cooking appliance casings mounted thereon, adapted for only simultaneous use and successive refilling with material to be cooked, a heating element in each casing, a conduit spanning the distance between said casings and spaced above and free of said base, wiring for said heating elements extending through said conduit and electric terminals carried by one of said casings and connected with said wiring, said terminals being positioned so that an electric supply cord connected therewith extends from said one of said casings at a position substantially between the casings.

WILLIAM H. FISCHER.